(No Model.) 5 Sheets—Sheet 1.

J. P. HERRON.
APPARATUS FOR DREDGING HARBORS, DITCHING SWAMPS, &c.

No. 265,500. Patented Oct. 3, 1882.

(No Model.)　　　　　　　　　　　　　　　　5 Sheets—Sheet 4.
J. P. HERRON.
APPARATUS FOR DREDGING HARBORS, DITCHING SWAMPS, &c.

No. 265,500.　　　　　　　　　　Patented Oct. 3, 1882.

Witnesses,　　　　　　　　　　　Inventor, (No Model.) 5 Sheets—Sheet 5.
J. P. HERRON.
APPARATUS FOR DREDGING HARBORS, DITCHING SWAMPS, &c.
No. 265,500. Patented Oct. 3, 1882.
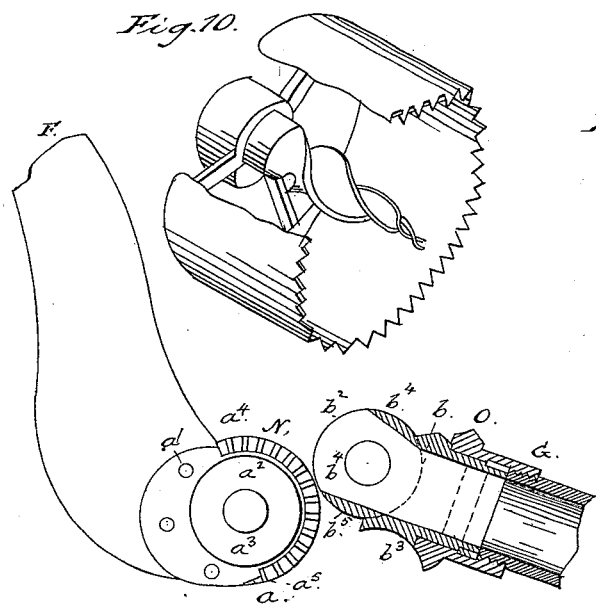
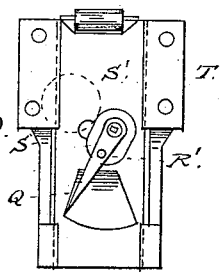
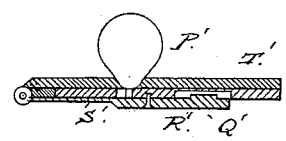
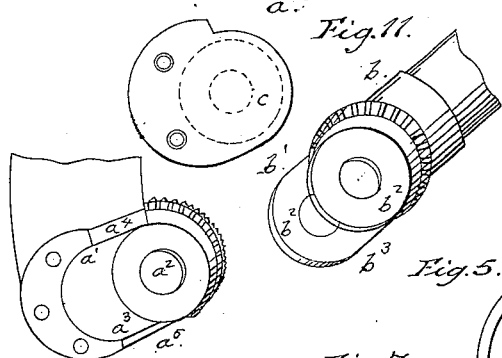
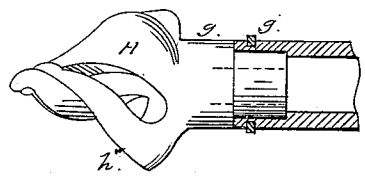
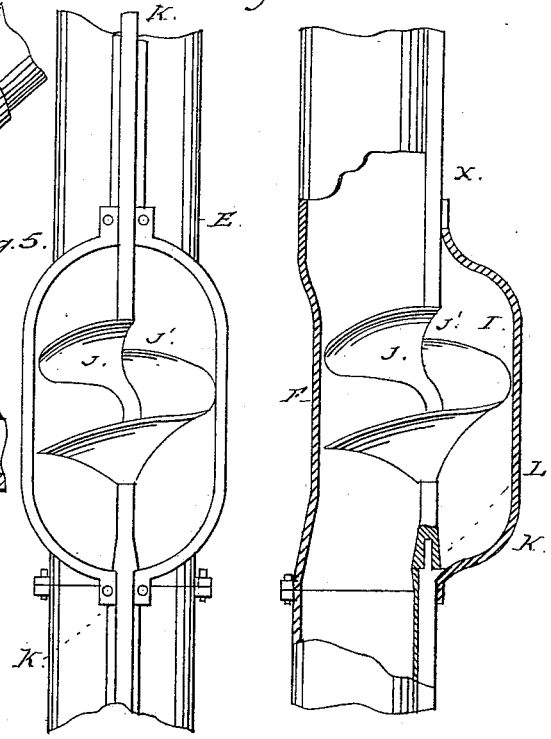
WITNESSES
W. A. Jones.
Phil Martin
INVENTOR
James P. Herron

UNITED STATES PATENT OFFICE.

JAMES P. HERRON, OF WASHINGTON, DISTRICT OF COLUMBIA.

APPARATUS FOR DREDGING HARBORS, DITCHING SWAMPS, &c.

SPECIFICATION forming part of Letters Patent No. 265,500, dated October 3, 1882.

Application filed July 25, 1881. (No model.)

*To all whom it may concern:*

Be it known that I, JAMES P. HERRON, of Washington, District of Columbia, have invented a certain new and improved dredging, excavating, and conducting apparatus for reclaiming harbors, water-channels, and swamp and overflowed land, which I denominate a "Reclaimer;" and I do hereby declare the following to be a full, clear, and exact description of the same, reference being had to the accompanying drawings, forming part of this specification, in which—

Figure 1:
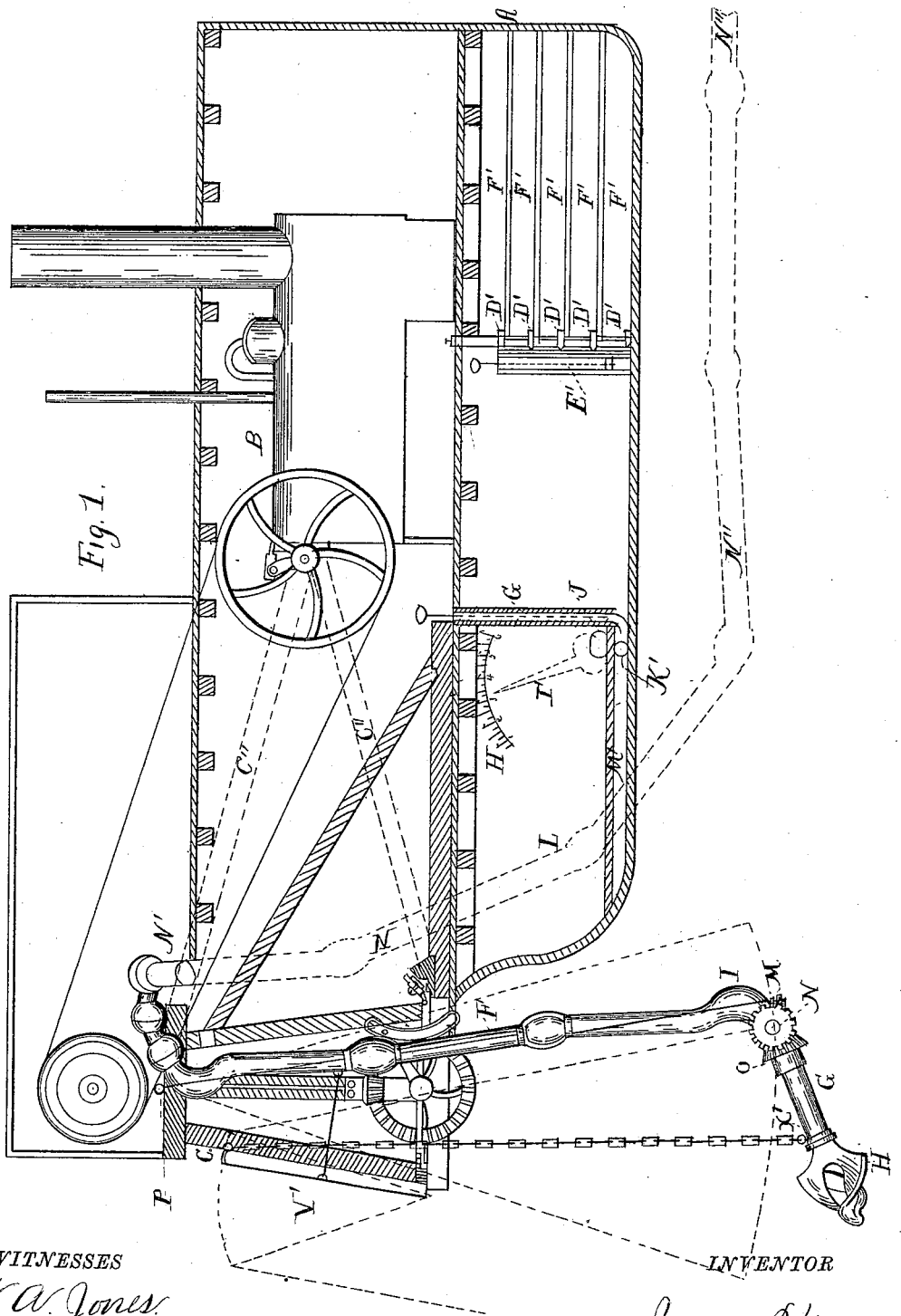
Figure 2:
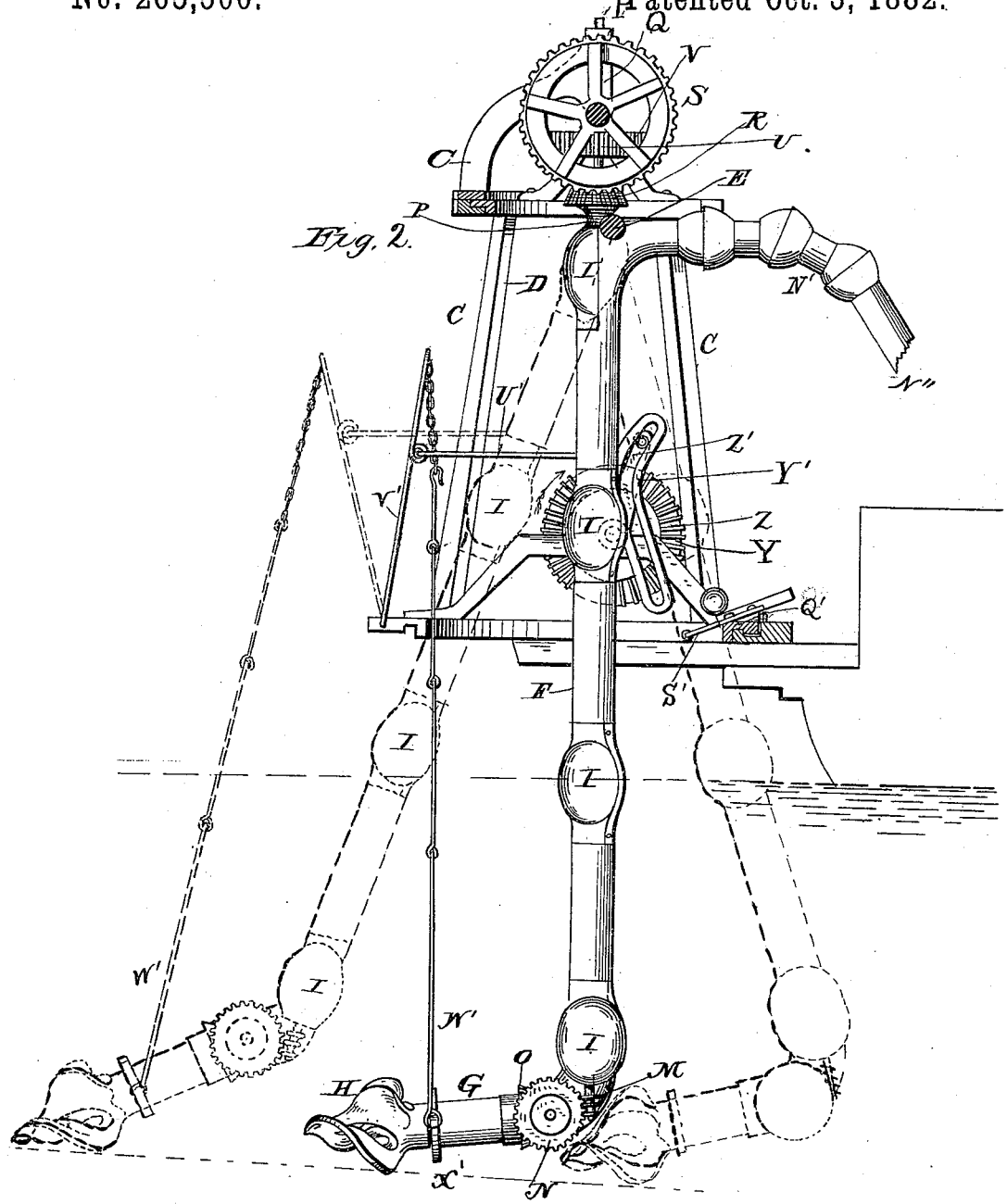
Figure 3:
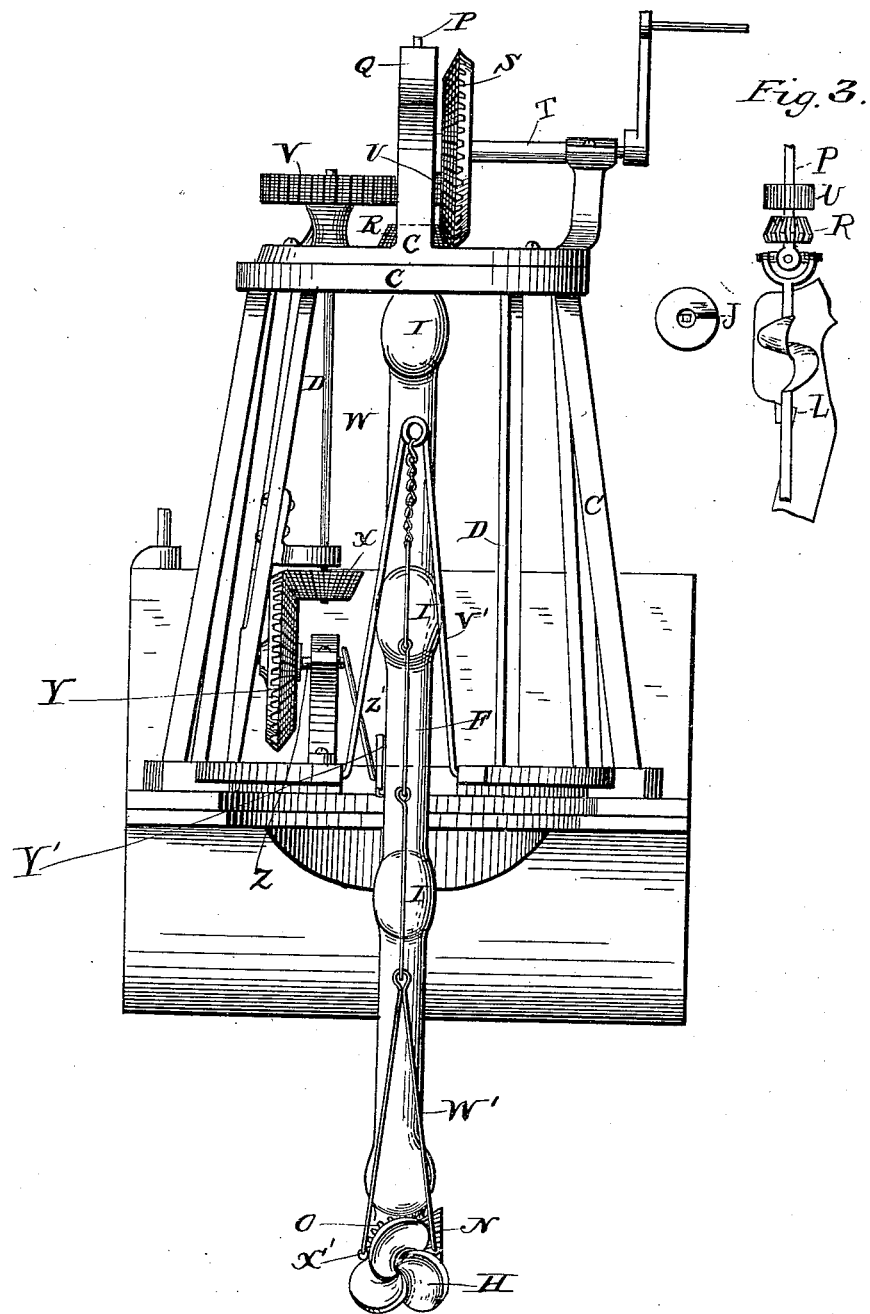
Figure 4:
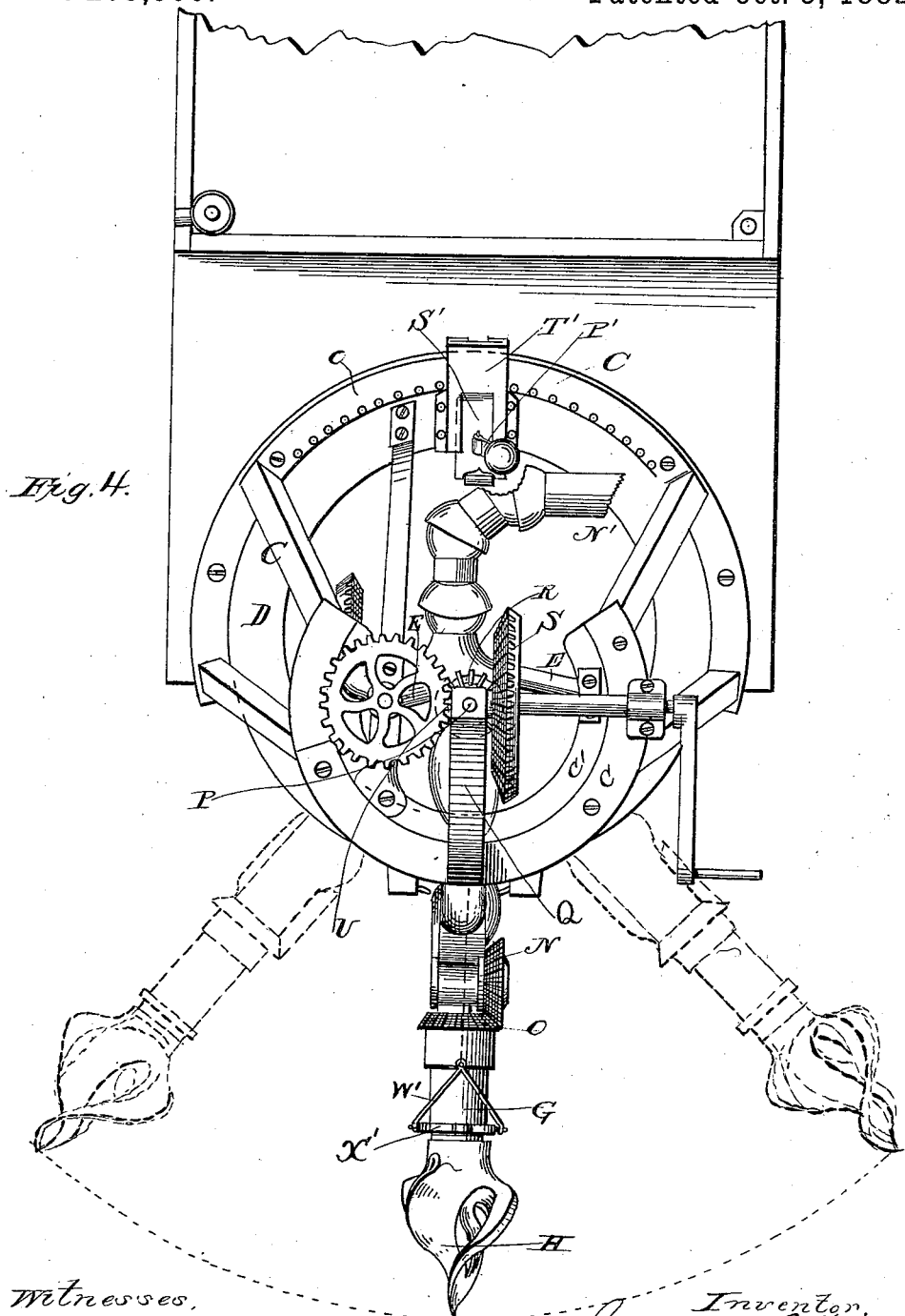

Figure 1 is a longitudinal sectional elevation of the reclaimer. Fig. 2 is a similar view of the same enlarged, the boat being almost entirely omitted. Fig. 3 is a front elevation. Fig. 4 is a top plan view. Figs. 5 and 6 are views showing the arrangement of the propellers in the pump-tube. Fig. 7 is a view of the excavating-tool. Figs. 8 and 9 are views of the devices which operate to move the turntable. Fig. 10 is a view of a boring and sawing tool which may be used in place of the tool shown in Fig. 7 when desired. Fig. 11 is a view showing particularly the construction of an ankled joint between a leg-like pump-tube and foot-tube, which carries the excavating-tool.

Similar letters of reference in the several figures indicate the same parts of the reclaimer.

The object of my invention is to provide improved means for dredging up mud, sand, gravel, and other material from the bottom of rivers and other bodies of water; for excavating canals, ditches, &c.; for building sea-walls and dikes, and for reclaiming water-channels and sunken and overflowed swamp-lands, &c.

The invention consists, first, in a novel excavating tool or bit for disengaging or loosening and taking in the material to be removed by the reclaimer.

It consists, second, in a pump of novel construction for elevating and carrying off the material after being so loosened by the tool.

It consists, third, in an improved manner of rotating the excavating-tool from the shaft of the pump.

It consists, fourth, in a mechanism for imparting to the excavating-tool a forward-and-backward motion.

It consists, fifth, in mechanism for automatically moving and adjusting the excavating-tool laterally.

It consists, sixth, in supporting the excavating-tool so that it will hang in substantially the same plane during all its movements.

It consists, seventh, in improved means for keeping the boat on which the apparatus is mounted at the proper height from the bottom during the rise and fall of tides.

It consists, eighth, in certain details of construction and combination of parts for taking up material and conducting it continuously to place of discharge, which will be hereinafter fully described.

In the drawings of the reclaimer, A represents the boat carrying the excavating apparatus and an engine, B, for driving and operating the same.

Mounted upon the forward end of the boat is a frame-work, C, of suitable construction, that may be made to rise and lower, which serves to hold and support a rotating frame or turn-table, D. From the upper part of the turn-table D is suspended by trunnions E E a long pump-tube, F, the same being hung so as to permit of its being swung outward or inward and of being oscillated from side to side, as shown in Figs. 2 and 4.

To the lower end of the pump-tube is connected by a flexible jointed connection a short foot-tube, G, consisting of the neck $g$ and the hollow collar-block $g'$. This foot-tube carries at its outer end an excavating-tool, shown in the present form of the device as a conoidal diverging flanged bit, H. The pump-tube is formed with a number of enlargements, my preferred form being that of the swells I, in each of which works a single elevating screw-section or spiral propeller, J, as shown in Figs. 3, 5, and 6. The diameter of each of the enlargements, as proportioned to the diameter of the pump-tube, is about as one and one-half to one and seven-eighths is to one—that is to say, when the body of the pump-tube is made twelve inches in diameter the enlargements are preferably made about eighteen to twenty-three inches in diameter. This difference in favor of the enlargements is for the purpose of enabling them to accommodate larger propellers, and thus increase the lifting-power of the pump, so that by giving the propellers about three hundred fifty to four hundred revolutions per minute an unbroken column of flowing material will be conducted at a velocity of from eighteen to twenty-five feet per second. This gives a full, active flow through the leading-pipes conducting the same from one propeller to another, and also enabling larger solid bodies to pass through the pump-tube and not be impeded at all in passing through the propeller. All the propellers may be fixed on a single shaft-connection extending from top to bottom of the pump-tube, if desired; or I may employ a series of short shafts or shaft-sections, K, and attach a propeller securely onto one end of each shaft-section and form the other end of the shaft-section square, so as to fit within a corresponding square socket in the first-mentioned end of the next adjacent section or end of the propeller, each section being formed with a bearing for its support upon the abutments, as hereinafter described, and as shown in Figs. 5 and 6. In this way motion imparted to either shaft-section is communicated to all the others throughout the series, and in case of damage to or breakage of any one of the propellers it can alone be removed without taking out all the others, and in the same way be replaced. In my preferred construction I place at the lower end of each enlargement or swell an abutment or offset, L, on which the lower end of the propeller has a bearing. This construction is for the purpose of relieving the shaft-sections from strain when the propellers are lifting the water and excavated material through the pump-tube, and causing said strain to be borne by the pump-tube itself. Each enlargement may be made in two parts, one consisting of the main body of the pump-tube and the other of a removable part or cap adapted to be secured by bolts, as shown. Access can be had to the propeller at any time by taking off the cap or removable parts of the enlargements, as will be readily understood.

The propellers consist of metallic plates twisted into the form of a spiral, as shown in Figs. 5 and 6, the plates being of such width less than the radius of the outer margin of the spiral as to leave an open and unobstructed space at the axis of it. The shaft upon which this spiral revolves is attached one part at one end, the other at the other end, of the spiral; or it may be twisted to follow continuously the inner margin of the spiral plate to strengthen the same. This leaving the axial region of the spiral open and unobstructed, together with sufficient pitch given to the spiral, enables large masses of soil or stone to be passed through the pump. Further, the spiral is so formed that in the vertical plane of every radius the outer margin is higher than the inside, so giving to the spiral a "dishing" toward the axis. This causes the material elevated always to seek the center or axis of the column. The spirals are of greatest diameter midway between their ends, tapering thence toward each end, so as to conform to the shape of the enlargements I; or they may be made with but one hollow spiral turn or regular twist to fill a cylinder of about equal length and diameter, and with no tapering toward the ends, but of an equal diameter and regular pitching turn and with an open center and a shaft starting therefrom. The lowest shaft or propeller section projects through the bottom of the pump-tube, and is provided with a worm-gear or screw power, M, which meshes into the periphery of and drives a bevel-gear wheel, N, which in turn imparts a boring rotation to the tube G, carrying the excavating-tool. This is effected through the medium of a gear, O, secured to said tube, as shown in Figs. 1, 2, and 4.

There is one advantage in employing a continuous propeller-shaft instead of a shaft composed of several sections—namely, the weight of the material lifted by the propellers and borne by the shaft is largely supported by the worm upon the worm-gear in the driving of the excavating-tool, and is to that extent taken off the abutments, thereby avoiding a large amount of friction at those points.

Propeller-shafts in sections above may be adjusted to the lower section, so as to communicate all downward weight of each to the lower one, and by it to the wheel N, thereby similarly avoiding retarding friction. The uppermost shaft-section of the series also projects through the pump-tube, and is connected by a universal-joint coupling to a short shaft, P, having its bearings in an arm or bracket, Q, of the frame-work C, as shown in Figs. 2 and 3.

Secured to the shaft P is a beveled pinion, R, with which meshes a large driving beveled gear, S, mounted upon a shaft, T, which is journaled in bearings on the top of the stationary frame-work C, and is a driven by suitable belting and pulleys from the engine B. Also secured to the shaft P, above the beveled pinion, is a pinion, U, which meshes with a larger spur-gear, V, secured to the upper end of a vertical shaft, W, journaled in bearings on the movable turn-table, as shown in Fig. 3. On the lower end of the shaft W is secured a beveled pinion, x, which meshes with a beveled gear, Y, fixed to a short horizontal shaft, Z.

Secured to the inner end of the shaft Z is a crank, Z', the wrist of which is adapted to play back and forth in a cam-slot in an angular K-shaped arm, Y', secured to the pump-tube, and when the said crank is rotated this imparts to the pump-tube a forward-and-backward swinging motion. An anti-friction sleeve is preferably mounted on the crank-wrist to reduce the friction in its revolutions in the cam-slot. The cam-slot in the arm Y' is formed, substantially as shown, so as, upon revolution of the driving-spur V in the direction of the arrow, to cause the pump-tube to be swung slowly forward and held stationary at the limit of its forward movement for about one-fourth of the time occupied by the arm in performing its circuit, to give an opportunity for the more effective operation of the excavating-tool at that point, and, on the other hand, to cause a more rapid backward movement of the pump-tube, while the excavating-tool is not required to do so much operation.

For the purpose of maintaining the excavating tool or bit in substantially the same plane whether the pump-tube be swung outward or inward, the foot-tube G is provided with a loose collar, $x'$, to which is connected a suspending bail or rod, W', that in turn is connected by a chain or a series of jointed rod-sections to a vibrating yoke, V', mounted upon the turn-table and connected by the rod U' to the pump-tube, as shown in Fig. 2. As the pump-tube swings forward and backward these suspending devices so hold the tube G as to cause the excavating-tool to work in substantially the same plane at all times.

On the rear portion of the turn-table D is secured a slotted inclined loop or guide-plate, T', (see Figs. 8 and 9,) back and forth within which is adapted to move a sliding plate, S'. This sliding plate has pivoted to its under side, at R', a wedging-lever, Q', the rear or shorter end of which is perforated and receives the downward-projecting end of a weighted pilot-ball for shifting and holding the wedging-lever P', mounted on an axis or pivot running longitudinally of the plate S', as shown in Figs. 4, 8, and 9. As the sliding plate is moved back and forth the pilot-ball lever plays within the slot of the guide-plate T', as will appear from an inspection of Figs. 4 and 9.

Secured to the rear curved portion of the stationary frame-work C is a segmental rack, O, with the teeth of which the wedging-lever Q' of the sliding plate is adapted to engage when said plate is operated.

The operation of these last-described devices is as follows: When the pump-tube is swung backward by the operation of the crank the lower end of the slotted arm or K-shaped cam (marked Y') is extended downward far enough, or the pump-tube itself strikes the inner end of the sliding plate S' and pushes it forward and outward until its wedging-lever Q' strikes one of the teeth of the stationary rack-bar. If said arm or wedging-lever happen to be turned to the left, its inclined side will meet the tooth, and while said inclined side travels along against it the whole turn-table and the parts mounted on it will be moved to the left the distance of one tooth. Then, upon the forward movement of the pump-tube, the sliding plate will slide back down to its normal position, the point of the wedging-lever which was diagonally between the two teeth of the rack yielding to the right to escape the tooth upon its left, and clicking past it, but by the weight of the pilot-ball resuming its position to the left, ready to be again operated as before. At each succeeding backward movement of the pump-tube the sliding plate is thus advanced and the turn-table is caused to turn around to the left the distance of one tooth. The turning of the turn-table of course causes the excavating-tool to move farther to the left, step by step, till it has operated over a large area. When it has reached its limit of movement to the left the weighted lever or pilot-ball P' is shifted or turned over toward the other end of the slot S in the guide-plate in which it works, which causes the pivoted arm or wedging-lever Q' to swing to the right; and when the slide or wedging-lever next advances the turn-table is made to move to the right, and it so continues to move, step by step, till it reaches its other limit again, whereupon the pilot-ball is again shifted. The automatic turning of the turn-table is thus insured.

Special means may be employed for shifting the weighted lever or pilot-ball automatically when the turn-table reaches the limit of its movement in either direction, or said weighted lever may be shifted by hand. Ordinarily the weight of the sliding plate and the weighted lever is sufficient to bring the sliding plate back again to its normal position after acting upon a tooth of the rack; but should it be deemed advisable a cord or chain could be connected at one end to the sliding plate and the other end to the arm or K-shaped cam Y', so that when the pump-tube moved outward the sliding plate S' would be pulled back positively to its normal position.

Other forms of mechanism than that herein shown and described may be employed for feeding the turn-table by the operation of the pump-tube, but perhaps nothing more simple or effective could be used than that described.

The excavating tool or bit H is preferably conoidal-shaped, and has exterior spiral cutting flanges or ribs diverging from the point, and slots $h$ between said ribs opening into the interior of the hollow stem of the tool, as shown in Fig. 7. The said spiral ribs may, if desired, be armed with removable cutting-plates $h'$.

The upper end of the pump-tube is connected with a flexible tube or by a flexible jointed extension-pipe, N' N'', through which the material dredged up is conducted and discharged, as desired, to fill, spread out, and elevate at any distance from where it is taken.

In operating the apparatus the engine is started up, and through the connections before referred to the propellers are caused rapidly to revolve, so as to create a powerful suction and lifting within the pump-tube, while the rotary motion is also imparted to the foot-tube G and the excavating tool or bit H connected to it. The spiral ribs of the excavating-tool act as the cutting or excavating edges, and not only cut the sand, gravel, or mud loose, but direct it into the slots between the ribs, whence it is carried by the suction through the revolving tube G, continued through, and discharged at the upper end of the pump-tube; or it may be continued by flexible or other pipes to any distance for discharge. The slots in the excavating-tool are made of such size as to prevent the admission of anything through them that will not pass readily through the pump-tube and past the propellers easily. If desired, removable steel cutting-blades may be attached to the ribs of the tool, and as they wear they can be removed and replaced by like blades. Stones, bowlders, &c., that will not pass through the tubes are thrown back and collected along under the reclaimer, so as to be taken up and removed from the rear end of the boat. The material dredged up may be conveyed by the pipe N′ to barges brought alongside or behind the boat, and discharged into them; or it may be conveyed along through said pipe and other pipes, N″ N″, connected to it to the land which it is desired to build up or reclaim from the water. A dike or sea-wall may easily be formed from the material discharged through the said pipe-connections N′ N″, as shown, simply using a movable fence or guardway-partition with a suitable inclination and strength to bear the end of the discharge-pipe, from which the heavier material fills easily against the guardway, the lighter parts flowing away from it and keeping the earth, &c., from flowing back under the boat. When the deposit is high enough the fence or guard can be moved along with the advance of the boat for the purpose of prolonging the dike and work thereof.

When the reclaimer is used for swamp-ditching the material excavated, instead of being piled up on the banks of the ditch, may be conveyed far away through tubes and discharged upon low lands.

While the excavating-tool and the pump continue to operate the pump-tube is moved forward and backward and to the right and left by the mechanism before described, and the relative position of the excavating-tool is always maintained by the operation of the suspending devices, as hereinbefore set forth.

The joint, ankle-like, between the lower end of the pump-tube and the shifting foot-tube G is of peculiar construction and deserves special mention. It is best represented in Fig. 11. The lower end of the pump-tube is made rounding to give the column of excavated matter a natural turn into the vertical tube, and is cut away at top and bottom and at one side, leaving only a side wall or flange, $a$, projecting out beyond the top and bottom, as shown. The joint of the foot-tube with the vertical or pumping tube is preferably a hollow knuckle joint, though a hollow ball and socket may be used, if desired. A sleeve, $b$, upon one end of which the foot-tube G rotates, is formed at its other end with circular side disks, $b^2$, and otherwise is formed at the same end like a portion of a cylinder with a horizontal axis, the side thereof at the sleeve end being open. The lower end of the pump-tube is formed to inclose the said cylindrically-formed sleeve end to allow it a limited vertical swing, the portion $b'$ being always confined within the part $a'$ and the part $b^3$ within the part $a^3$, except when, it being desired to empty the foot-tube without pumping its contents up through the pump-tube, the foot-tube is swung up to its limit of movement and the part $b^3$ swings past the part $a^3$, exposing the lower part, $b^4$, of the open end of the sleeve, whereupon the contents of the foot-tube readily flows out. The sides of the socket in the pump-tube are formed of circular disks, one of which may be fixed and the other removable, as cap $c$. In the circular recesses of these side disks the laterally-projecting disks $d^2$ of the sleeve engage, holding the parts of the joint together. If desired, central pintles, $a^2$, upon the side disks of the socket may project into and engage with central holes of the side disks, $b^2$, of the sleeve. Shoulders $b^4$ $b^5$ upon the sleeve, meeting like shoulders $a^4$ $a^5$ on the socket, limit the vertical swing of the foot-tube.

In swamp-ditching and other work it is sometimes necessary to remove roots of trees and sunken logs before the work can further proceed. In such cases the tube G may be raised and elevated high enough to allow the excavating-tool to be removed and be replaced by the drilling and sawing tool, as shown in Fig. 10, which is a cylindrical barrel-saw with a drill-center bearing-point to hold in a leading position for sawing, which is done by the saw, in place of the excavating-tool, revolving and cutting its way through whatever it comes in contact with on a horizontal line, and may be elevated or lowered by motion of tube G; or the whole working apparatus and machinery may be elevated or lowered by being placed on a frame extending back with a hinge connection on a line with the center of the driving-pulley of the engine, so as to keep the belt fully adjusted between the pulley on the apparatus and the driving-pulley of the engine, as may be understood by dotted showing in Fig. 1. When this last-mentioned tool has performed its office it is removed, and the freed obstruction is then, by means of a crane or other contrivance, pulled up and taken out. The excavating-tool is then again secured in position and the work proceeded with. When rocks or bowlders are met with that cannot be undermined and dropped below out of the way a rock-drill of any preferred form and kind may be substituted for the excavating-tool and caused to penetrate the rock horizontally at its base, so as to admit a cartridge for exploding and blasting it, so that it may be removed.

In order that the pump-tube may be rendered controllable while either the sawing-tool or rock-drill is in operation, the spur-gear which drives the mechanism for effecting the oscillating and circulating motions of the pump-tube may be detached.

The forward part of the boat is divided into two compartments—namely, a small lower compartment, M′, and a large upper compartment, L′—there being no communication between the two. The lower compartment, M′, has an opening, K′, Fig. 1, leading out through the side of the boat and adapted to be opened and closed by a suitable valve or cut-off. The upper compartment, L′, has an opening, J′, likewise leading out through the side of the boat, and closed also by a cut-off. The stem or operating-arm I′ of this last-mentioned cut-off is formed into a pointer or index, and is adapted to be moved along a graduated scale, H', to indicate how far open the cut-off is. This arrangement of compartments and their accessories is for the purpose of maintaining the boat at the proper distance from the bottom at all stages of the tide where the apparatus is used in tide-water. When the tide is rising—the first five inches, for instance—the valve in the lower compartment is opened and the water is allowed to run in until said compartment is full. By the time it is full the bow of the boat has been sunk about five inches. Then if the full rise of the tide is known to be, say, three feet and five inches, the arm I' of the cut-off in the upper compartment is swung around until opposite the figure 3, or suitable place on the scale H', which movement opens the valve and allows the water to run into the upper compartment as fast as required to sink the boat to keep it at the proper distance from the bottom while the tide is rising the remaining three feet. When the tide begins to fall the cut-offs are all closed and the water is drawn out of the lower compartment gradually by a pump, G', operated by hand or power to suit the falling of water outside. This gives buoyancy to the boat, raising the water in the upper compartment above the outside water; so by opening the scaled water-passage the discharge will be with the falling tide, and, like the inflow, adjusting the boat and its appliances to the tides rising and falling. The maintenance of the boat in the proper position is thus effected by the in and out flow of water without the expenditure of any more power than is required to pump out the lower small compartment once each rise and fall of tide and to manipulate the cut-off.

It is sometimes desirable to elevate the bow of the boat or to ballast the boat, and to enable this to be done I have divided the rear or stern of the boat into a number of small compartments, F', one above the other, or they may be otherwise, all of which are connected to a force-pump, E', and any one or more of which is capable of being filled full by said pump and kept so by closing a cut-off or valves, D'. In this way a stable water-ballast of any amount is afforded, and the stern of the boat can be depressed and the bow of the boat thrown up as high as desired. This matter of providing a ballast can be utilized in other than dredge-boats with equal effect.

I am aware that centrifugal pumps and others have been used for lifting mud, sand, gravel, &c., and for dredging, in which valves, buckets, and close-working parts are employed, being subject to great friction and wear, and narrow spaces and hard friction turns, causing much wearing of parts, loss of power, and inability to pass large solid substances, and not very large gravel can pass through the working parts of such pumps, and the contact in passing is very wearing on them. All such detriments I avoid by the direct forward motion given to the moving material. The propellers, with centripetal action on the passing column, hugging around it and elevating it forward into the conducting-tubes, are like the action of wedges under the base of an upright shaft, and the large open central spiral bearings on the propellers are able to pass any stones or bowlders that the pipe or tubes will admit, and as the heavier parts move in the center while propelled through the pipes and tubes they are passed through my pump with but little interruption or contact with the propelling machinery. Pumps with propellers on shafts and centrifugal machinery interrupt and break through all the passing column, thereby causing very great wear of parts and friction, and necessarily require much greater motive force or power.

I am aware that machinery for dredging has been used for taking up mud and conducting it through pipes or tubes to places of deposit, but with interruptions by stoppages in dipping or scooping up, and alternate action of valves in hydraulic machinery, centrifugal, steam vacuum, and other pumps, inclosed pressure and open elevated bins, with altitudes and forces to move the material through the tubes or pipes. Such machines will not pass large gravel and bowlders through them, and such will not do the work I wish to do.

What I claim as my invention, and desire to secure by Letters Patent, is—

1. A conoidal-shaped excavating-tool having spiral ribs or flanges, open slots between the flanges, with an open hollow shank, substantially as described.

2. A conoidal-shaped excavating-tool having spiral ribs provided with cutting-edges, open slots within the ribs, and a hollow shank, substantially as described.

3. A centripetal lifting and suction pump consisting of the pump-tube having enlargements or swells for propellers, a rotary shaft extending solid or in sections from top to bottom, and a series of centripetal spiral propellers, open and unobstructed in their axial region, arranged upon the shaft within the enlargements or connected in sections, substantially as described.

4. A spiral centripetal propeller open at its center throughout, mounted upon a shaft, as described, said shaft having at one end a squared socket to receive the squared end of the shaft of the next adjacent propeller, whereby one section communicates motion to the series of sections, substantially as described.

5. The combination, with the pump-tube having the enlargements or swells, of a spiral centripetal propeller with shaft attachments for pumping purposes, substantially as described.

6. The combination, with the pump-tube having an oscillating and circulating movement, of a pump-shaft, a driving-shaft, and a universal joint or flexible connection to communicate motion to propellers from a fixed or stationary power, substantially as described.

7. The combination of a shaft with a flexible or universal joint at one end, worm-gear at the other, and a rotary excavating-tool, for the purposes set forth, substantially as described.

8. The combination of a bevel-gear wheel connected with a worm-gear with the revolving foot tube or pipe, substantially as described.

9. The combination of a revolving foot tube or pipe with a leg pipe or tube, substantially as described, for conducting water and other material to said pipe or tube.

10. The combination, with the foot and leg pipes or tubes, of the hollow knuckle-joint to afford continuous free open passage-way within and between said pipes or tubes, substantially as described.

11. The combination of the pump-tube having enlargements or swells and the shaft-sections, each carrying a propeller at one end, and having its other end squared to fit into a square recess on the end of the next shaft-section, whereby the several sections are adapted to be fitted together within the tube, substantially as described.

12. The combination of the pump-tube having the enlargements or swells, the shaft-sections, each carrying a propeller at one end and having its other end squared, and the abutments on the pump-tube forming bearings and supports for the propellers, substantially as described.

13. The combination of a suction-pump and a tube jointed to the lower end of the pump-tube, and carrying a rotary excavating-tool having cutting-ribs, slots within the ribs, and a hollow shank opening into the jointed tube, substantially as described.

14. The combination of the pump-tube with the foot-tube carrying the excavating-tool, and swiveled upon a sleeve which is connected to the pump-tube by a knuckle-joint and rotated by power derived from the pump-shaft, substantially as described.

15. The combination of the pump-tube, and the foot-tube carrying the excavating-tool and provided with a fixed gear, and swiveled upon a sleeve which is connected to the pump-tube by a hollow knuckle-joint, with the worm on the pump-shaft and the intermediate gear-wheel, substantially as described.

16. The combination, with the pump-tube and the foot-tube consisting of the neck which carries the excavating-tool and the hollow coupling collar-block, of the sleeve swiveled to the foot-tube and jointed to the pump-tube, substantially as described.

17. The combination, with the pump-tube, of the arm having the cam-slot and the operating-crank, whereby a slow graduated outward movement and a quick inward movement are given to excavating-tool, substantially as described.

18. The combination of the swinging pump-tube, carrying the rotary excavating-tool at its lower end, with the turn-table and mechanism set in operation by the swinging motion of the pump-tube, for automatically moving the turn-table in either direction to change the position of the excavating-tool, substantially as described.

19. The combination of the sliding plate on the turn-table, having the pivoted wedging-lever, with the rack on the stationary frame and the arm on the swinging pump-tube, whereby the turn-table is automatically turned as the pump-tube is vibrated, substantially as described.

20. The combination, with the sliding plate on the turn-table and its pivoted wedging-lever, of the weighted pilot-ball lever for holding the wedging-lever in position, substantially as described.

21. The combination, with the foot-tube carrying the excavating-tool and connected to the pump-tube by a hollow swivel and knuckle joint, of the means for suspending said foot-tube so as to keep the tube in the same plane during all its forward, backward, and lateral movements, substantially as described.

22. The combination, with the foot-tube carrying the excavating-tool, of the loose collar on said tube, the suspending bail and chains or jointed rods, the vibrating yoke, and the rod connecting the yoke to the swinging pump-tube, substantially as described.

23. The pump-tube provided with excavating mechanism, in combination with means for imparting to said tube a swinging forward-and-backward movement, and other means for turning it so as to give the excavating-tool a circulating or lateral sweep, substantially as described.

24. In a dredging-boat, the combination of the small lower compartment and the large upper compartment, each compartment having an opening through the side of the boat, and valves for closing said openings, and a pump for emptying the lower compartment, whereby the position of the boat with respect to the bottom can be regulated with the rise and fall of tide by the regulated in and out flow of water, substantially as described.

25. The method herein described of maintaining the boat at the proper distance from the bottom during the rise and fall of tide, consisting in allowing the water to flow in and fill a lower compartment, and then likewise permitting it to flow in through a gaged valve and fill an upper compartment while the tide is rising, then, when the tide begins to fall, closing the valve of the lower compartment and pumping out the water therefrom, so as to give buoyancy to the boat and cause the water to flow gradually out through the gaged opening of the upper compartment, substantially as described.

26. The series of small water-tight compartments F' at the stern of the boat and the pump for filling and exhausting the same, and the valves for cutting off communication with the pump, substantially as described, whereby an economical and easily-controllable ballast is provided.

27. The herein-described boat for dredging and ditching purposes, in combination with a centripetal propeller, suction and lifting pump placed and attached at the fore end of the boat, shifting on a rising and falling frame-work, as shown, and for the purpose substantially described.

28. A dredging and ditching boat made to sink and rise in flowing and ebbing tides, combined with an oscillating and circulating pump having a suspended foot-tube carrying an excavating-tool for dredging out harbors, river-channels, &c., to a uniform depth, as desired, in higher or lower stages of water, substantially as described.

29. A boat having engine power, with or without ballast arrangement, and having connected an oscillating and circulating pump with extended conducting-pipes, and a revolving foot-tube carrying an excavating-tool for ditching, dredging out, and reclaiming harbors, rivers, and water-channels, propelling the material uninterruptedly to shore-flats, overflowed lands, and low places for making levees or dikes, building up and reclaiming the same, substantially as set forth and described.

JAMES P. HERRON.

Witnesses:
MELVILLE CHURCH,
J. WATSON.